United States Patent Office.

FRANZ SEHR, OF BLANKENHAYN, GERMANY.

MANUFACTURE OF CEMENT.

SPECIFICATION forming part of Letters Patent No. 643,989, dated February 20, 1900.

Application filed October 21, 1899. Serial No. 734,386. (No specimens.)

*To all whom it may concern:*

Be it known that I, FRANZ SEHR, mechanical engineer, a subject of the German Emperor, residing at Blankenhayn, near Weimar, in the German Empire, have invented new and useful Improvements in or Relating to the Manufacture of Cement, of which the following is a specification.

The present invention relates to the production of a so-called "water-glass cement," the said cement offering the advantage over the cements known at present, made of water-glass and burnt clay, of utilizing the breakages and waste in porcelain manufactures— *i. e.*, hard-porcelain fragments and half-burnt-porcelain fragments reduced to powder and mixed with feldspar. This use of waste material is of great importance to chinaware manufacturers, since they already possess the machinery necessary for crushing and grinding the fragments. Further, the cement obtained from such material is snow-white in appearance, of constant uniform quality, and of extraordinary hardness and is eminently suitable for cementing porcelain, glass, and the like, and in special cases also for cementing these substances to metal and other bodies.

The cement is made by mixing a powder consisting of a mixture of ground hard-porcelain fragments, half-burnt-porcelain fragments, and feldspar with soda water-glass, so as to form a paste. The term "hard-porcelain fragments" applies to fragments of fully-burnt hard porcelain, while "half-burnt-porcelain fragments" are those resulting from breakage of porcelain which has been exposed to the first heat only. Swedish feldspar may be used as the other ingredient. These substances are ground to a very fine powder and intimately mixed, and the powder, when required as a cement, is moistened with soda water-glass and worked into a paste and quickly applied. Experience has shown that the ingredients when mixed in the following proportion, by weight, give satisfactory results: Fifty per cent. hard porcelain, thirty-five per cent. half-burnt porcelain, and fifteen per cent. feldspar.

The cement may be produced at a very low price. It very quickly sets and will withstand heat and water. Its cementing power for porcelain, glass, and metal is very great, and articles thus cemented rarely break again along the cemented line.

The cement is of very close texture or grain and is a non-conductor of electricity.

The new and essential characteristic feature of the invention is the employment of burnt-porcelain fragments or waste with feldspar, for only the use of burnt porcelain insures a cement of close grain and rapid-setting quality.

The new cement is eminently suitable for use in electric glow-lamps instead of the plaster-of-paris used at present. The cement is not much dearer than plaster-of-paris; but owing to its more rapid setting the lamps are sooner ready for use and handling, while the drawbacks associated with the use of plaster-of-paris—such as unevenness in setting, want of strength and resistance against damp, high temperatures, and noxious gases—are absent in the improved cement.

The cement may be used for any other purpose where cement is used—as, for instance, as a tooth filling or cement.

Having thus particularly described the nature of my invention, now what I claim is—

1. A cement consisting of powdered hard porcelain, half-burnt porcelain, feldspar and water-glass.

2. A cement consisting of approximately: fifty per cent. of powdered hard porcelain thirty-five per cent. half-burnt porcelain, fifteen per cent. of raw feldspar, and water-glass to form a paste.

In testimony whereof I have signed my name to this specification in the presence of two subscribing witnesses.

FRANZ SEHR. [L. S.]

Witnesses:
 THOS. EWING MOORE,
 MAX FASOLTY.